United States Patent [19]

Aoki et al.

[11] Patent Number: 4,483,602
[45] Date of Patent: Nov. 20, 1984

[54] APPARATUS FOR DETECTING A FOCUSING CONDITION OF AN OBJECTIVE LENS

[75] Inventors: Masahiro Aoki, Fussa; Kenichi Oinoue, Tokyo; Masatoshi Ida; Asao Hayashi, both of Hachioji, all of Japan

[73] Assignee: Olympus Optical Co., Ltd., Japan

[21] Appl. No.: 362,993

[22] Filed: Mar. 29, 1982

[30] Foreign Application Priority Data

Mar. 28, 1981 [JP] Japan .................................. 56-46086

[51] Int. Cl.³ .......................... G03B 7/08; G03B 17/20
[52] U.S. Cl. ................................... 354/402; 354/289.1
[58] Field of Search ................ 354/25 R, 25 A, 25 P, 354/25 N, 31, 31 F, 53–55, 60 L, 198–201, 288, 289, 402–404, 289.1, 219

[56] References Cited

U.S. PATENT DOCUMENTS

| | | | |
|---|---|---|---|
| 3,354,803 | 11/1967 | Winkler et al. | 354/289 X |
| 4,047,187 | 9/1977 | Mashimo | 354/25 |
| 4,075,640 | 2/1978 | Ueda et al. | 354/31 |
| 4,219,267 | 8/1980 | Suzuki et al. | 354/289 |
| 4,246,476 | 1/1981 | Stauffer | 354/25 X |
| 4,279,484 | 7/1981 | Kimura | 354/25 P |
| 4,297,014 | 10/1981 | Nakamura et al. | 354/25 |
| 4,305,657 | 12/1981 | Masunaga et al. | 354/25 X |

Primary Examiner—William B. Perkey
Attorney, Agent, or Firm—Parkhurst & Oliff

[57] ABSTRACT

In a single-lens reflex camera having an objective lens, a focusing screen and a view finder, a photodetector array is arranged to receive a central part of an object image formed by the objective lens and a focusing condition of the objective lens is detected by calculating an evaluation function from image signals supplied from the photodetectors. A presetting dial for selecting given photodetectors whose image signals are used for detecting the focusing condition is provided at such a position that a part of the dial is exposed to the outside through an opening formed in a rear wall of a camera body at a position underneath a film winding lever. A light emitting diode array is provided on the focusing screen so as to be seen by a user through the view finder. Only desired light emitting diodes are lighted on under the control of a signal supplied by the dial to indicate the region of the photodetector array which is used for detecting the focusing condition.

19 Claims, 10 Drawing Figures

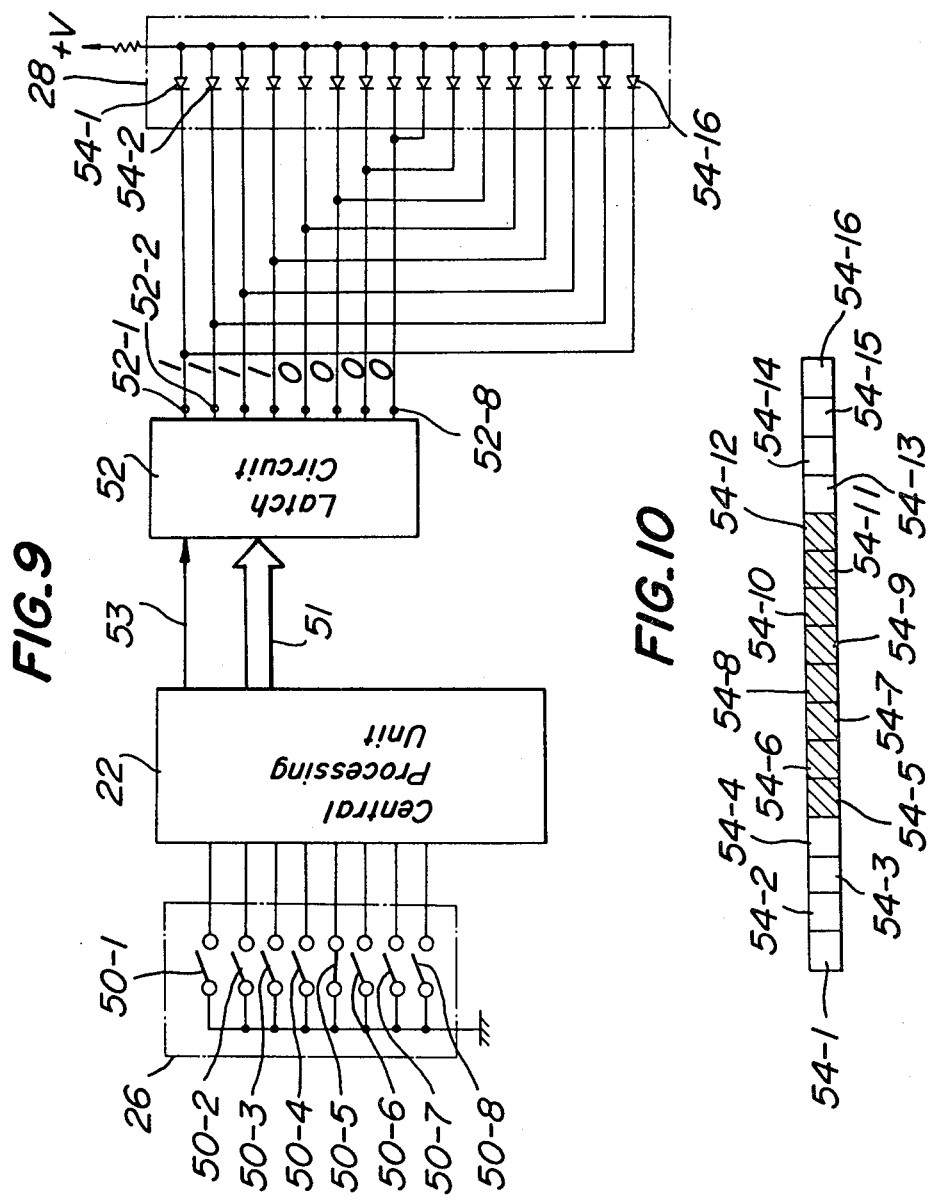

APPARATUS FOR DETECTING A FOCUSING CONDITION OF AN OBJECTIVE LENS

BACKGROUND OF THE INVENTION

This invention relates to an apparatus for detecting a focusing condition of an objective lens provided in an optical machinery such as a still camera comprising a focusing screen arranged at a position optically conjugated with a predetermined focal plane such as a film plane, a view finder for inspecting an image of an object formed on the focusing screen, at least one photodetector array arranged on or near a plane optically conjugated with the predetermined focal plane, means for projecting a part of the object image upon the photodetector array, and a control unit for processing output image signals supplied from the photodetector array in accordance with a given evaluation function to derive a signal representing the focusing condition of the objective lens.

Such a focus detecting apparatus is known and is used in a still camera. The apparatus comprises the photodetector array comprising a number of photodetectors. A part of an optical image of an object to be photographed is projected upon the photodetector array in such a manner that when an infocused image is projected upon a film, an infocused image is also projected upon the photodetector array. Therefore, by detecting a contrast or sharpness of the image projected upon the photodetector array, it is possible to detect the focusing condition of the objective lens. Usually the image detected by the photodetector array is selected to a central portion in the field of view and thus, when the camera is directed toward the object in such a manner that a subject in a scene is situated at the center of the field of view, the focusing condition of the objective lens with respect to the interesting subject can be correctly detected. However, the subject image is not always situated at the center of the field of view or an image of object in foreground or background may be projected upon the photodetector array. In such a case, the focusing condition of the objective lens could not be detected accurately and the objective lens might be erroneously focused onto the object in the foreground or background.

SUMMARY OF THE INVENTION

The present invention has for its object to provide an apparatus for detecting a focusing condition of an objective lens, which can obviate the above mentioned drawback of the known focus detecting apparatus.

It is another object of the invention to provide an apparatus for detecting a focusing condition of an objective lens, in which an active region of a photodetector array used for detecting the focusing condition of the objective lens can be electrically adjusted at will in accordance with the size of a scene to be picked up.

It is still another object of the invention to provide an apparatus for detecting a focusing condition of an objective lens, in which a user or photographer can monitor or certify by means of a view finder which part of an image of an object is used for detecting the focusing condition.

According to the invention, in an apparatus for detecting a focusing condition of an objective lens of an optical machinery comprising a focusing screen arranged at a position optically conjugated with a predetermined focal plane, a view finder for inspecting an image of an object formed on said focusing screen, a photodetector array having a number of photodetectors arranged closely side by side on or near a plane which is optically conjugated with the predetermined focal plane, means for projecting a part of the image of the object upon said photodetector array, and means for receiving image signals supplied from said photodetectors and for processing the image signals in accordance with an evaluation function to detect the focusing condition of the objective lens, the improvement comprises means for selecting the size (magnitude) and/or position of an active region of said photodetector array used for detecting the focusing condition of the objective lens in accordance with the size of the image of the object projected upon the photodetector array.

BRIEF DESCRIPTION OF THE DRAWINGS

FIG. 9 is a circuit diagram showing an embodiment of a display control circuit according to the invention; and FIG. 10 is a plan view illustrating an embodiment of a display device according to the invention.

DETAILED EXPLANATION OF THE PREFERRED EMBODIMENTS

Figure 1:
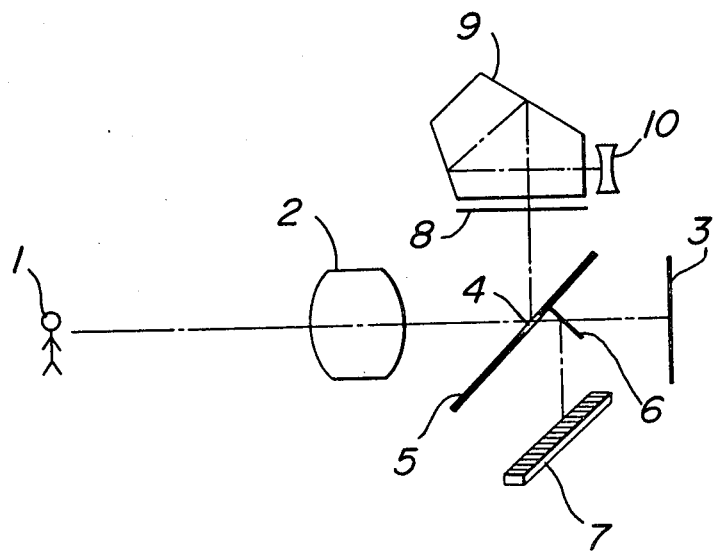
FIG. 1 is a schematic view showing a construction of a single-lens reflex camera comprising a known focus detecting apparatus.
Figure 2:
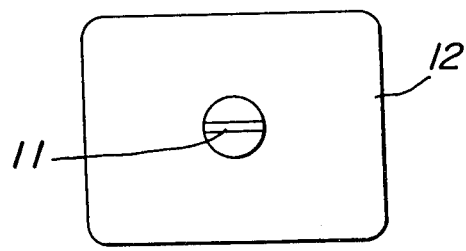
FIGS. 2 and 3 are plan views illustrating finder images of the camera shown in FIG. 1.

FIG. 1 shows schematically a single-lens reflex camera comprising a known focus detecting apparatus. Prior to photographing by focusing an image of an object or subject 1 by means of an objective lens 2 onto a photographic film 3, a light flux emanating from the lens 2 is divided by a half mirror 4 provided in a quick return mirror 5 and a divided light flux is made incident upon a photodetector array 7 by means of a small reflection mirror 6 secured to a rear surface of the quick return mirror 5. In this manner, a part of the image of the object 1, i.e. a central part of the object image is projected upon the photodetector array 7. A light flux reflected by the quick return mirror 5 is focused on a focusing screen 8 to form an image and the image thus formed is inspected by means of a view finder comprising a penta prism 9 and an eye piece 10. It should be noted that the photodetector array 7 and the focusing screen 8 are arranged in planes which are optically conjugated with the film 3, i.e. a predetermined focal plane.

In such a camera it is preferable that a user or photographer knows which portion of the object image is made incident upon the photodetector array 7. For this purpose, as shown in FIG. 1, a mark 11 corresponding to the photodetector array 7 is formed in the focusing screen 8. Therefore, the user can see the mark 11 in an image 12 of a field of view by means of the finder. In the known focus detecting apparatus, since a magnitude and/or position of a region of the photodetector array 7 used for detecting the focusing condition of the objective lens is fixed, a size and/or position of the mark 11 is also fixed.

Figure 3:
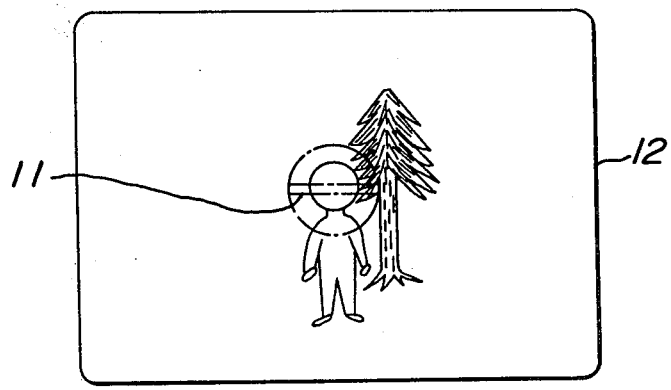

In case of taking a photograph of a person standing in front of a tree as illustrated in FIG. 3, not only the image of the person, but also the image of the tree are projected upon the photodetector array 7, because the mark 11 extends beyond the person into the tree in the background.

Now it is assumed that the photodetector array 7 comprises M photodetectors closely arranged side by side and each photodetectors produce image signals Xm. Then a sharpness of the image projected upon the photodetector array 7 may be represented by an evaluation function F(x) given by the following equation:

$$F(x) = \sum_{m=2}^{M} |Xm - Xm - 1|$$

Figure 4:
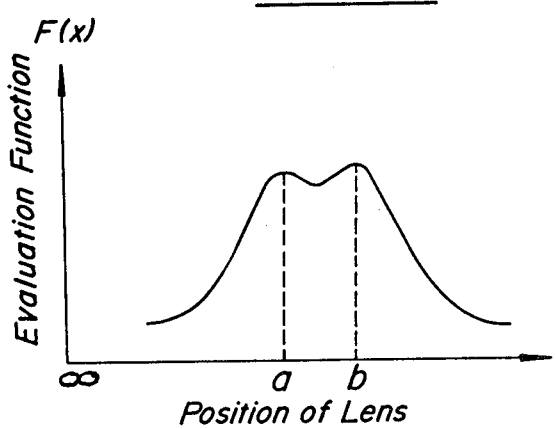
FIG. 4 is a graph representing a relationship between a position of an objective lens and a value of an evaluation function.

In this case, an infocused condition may be detected when the evaluation function F(x) has the maximum value. However, in the situation shown in FIG. 3, the evaluation function F(x) has two peak values as illustrated in FIG. 4. When the objective lens 2 is moved along its optical axis from an infinite point and comes in a position a, the evaluation function F(x) has a first peak, because the focused image of the tree in the background is formed on the photodetector array 7. When the lens is further moved toward the nearest point and comes into a point b, the evaluation function F(x) has a second peak, because the infocused image of the person is projected upon the photodetector array 7. In this manner when the evaluation function has a plurality of peaks the objective lens 2 might be focused for the tree which is not a subject. This drawback occurs not only in an automatic focusing system, but also in a simple focusing system in which only the detected focusing condition is displayed in the view finder.

Figure 5:
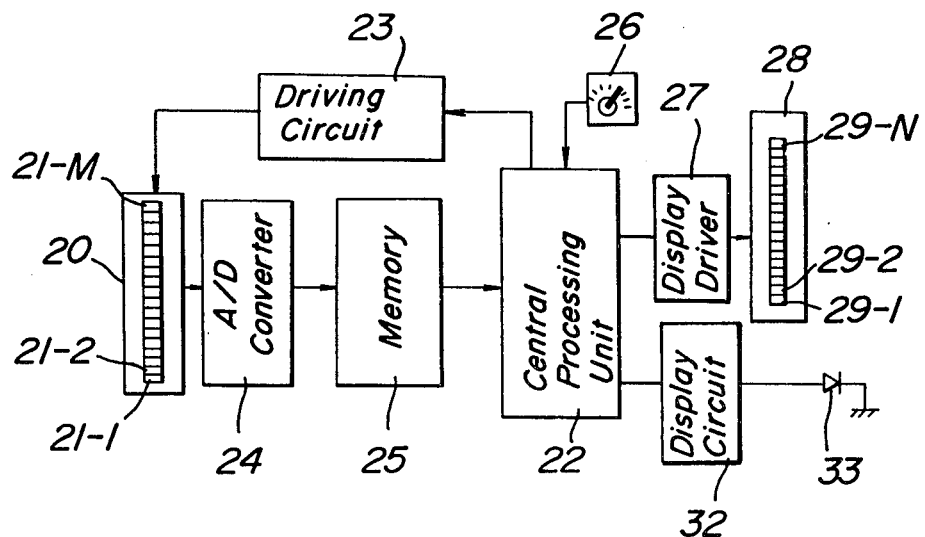
FIG. 5 is a block diagram showing an embodiment of the focus detecting apparatus according to the invention.

FIG. 5 shows an embodiment of the apparatus for detecting a focusing condition of an objective lens according to the invention. A photodetector array 20 comprises a number of photodetectors 21-1 to 21-M closely arranged side by side and a part of an image of a scene is projected upon the photodetector array 20 by means of an objective lens. The photodetectors 21-1 to 21-M are operated by a driving circuit 23 under the control of a center processing unit 22 so as to derive from the photodetectors analog image signals representing light intensities of light impinging upon respective photodetectors. The image signals thus derived are converted by an analog to digital converter 24 into digital signals which are then stored in a memory 25. According to the invention in order to preset or select an active region of the photodetector array 21 used for detecting the focusing condition of the objective lens in an electrical manner in accordance with the size of the object image projected upon the photodetector array, there is provided a photodetector presetting dial 26 for presetting externally photodetectors which are used for detecting the focusing condition. The photodetector presetting information is supplied to the central processing unit 22 and the central processing unit 22 selects given image signals among the image signals supplied from the photodetector array 21 on the basis of the presetting information. In the present embodiment, the presetting dial 26 is so constructed to denote the number of photodetectors which are not used for the focus detection. It is assumed that when the preset number is n, the image signals supplied from n photodetectors 21-1 to 21-n and 21-(M−n) to 21-M on both sides of the array 20 are neglected and only the image signals supplied from central (M−2n) photodetectors 21-(n+1) to 21-(M−n+1) are used for calculating an evaluation function. The evaluation function may be represented by any form. For instance, a sum of differences between image signals from adjacent photodetectors may be used as the evaluation function. Then the evaluation function is expressed as follows.

$$F(x) = \sum_{m=n+1}^{M-(n-1)} |Xm - Xm + 1|$$

In the central processing unit 22 only the image signals supplied from the photodetectors selected by the presetting dial 26 are used to calculate the evaluation function F(x) and the focusing condition of the objective lens can be detected in accordance with the calculated evaluation function.

Figure 6:
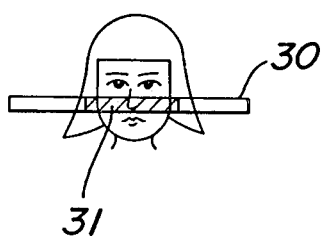
FIG. 6 is a plan view showing a finder image of the apparatus according to the invention.

At the same time, in order to indicate for the user a range or area of the photodetector array 20 which is used for detecting the focusing condition, the central processing unit 22 supplies a signal to a display driver 27 to actuate a display device 28. The display device 28 has a construction similar to the photodetector array 20 and comprises a number of light emitting elements 29-1 to 29-M closely arranged side by side. The indication of the region is effected by selectively driving the light emitting elements. The display device 28 is placed on the focusing screen 8 shown in FIG. 1 and thus, the user can see an image 30 of the display device 28 through the finder as shown in FIG. 6. In the image 30 a selected range 31 of the photodetector array 20 used for calculating the evaluation function is indicated by a hatched area and emits light. Therefore, the user can easily know the region of the photodetector array 20. At the same time, the central processing unit 22 actuates a focusing display circuit 32 in accordance with the result of calculation and a light emitting diode 33 is lighted on to indicate the infocussed condition. It should be noted that the objective lens may be driven by a lens driving circuit on the basis of the result of calculation.

Figure 7:
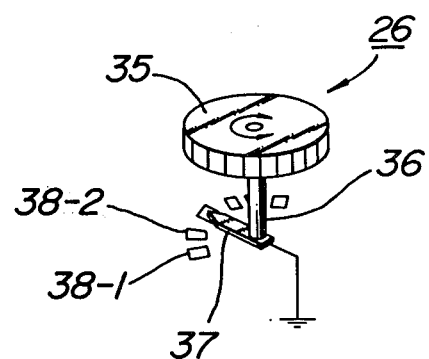
FIG. 7 is a perspective view illustrating an embodiment of a device for selecting a region of a photodetector array used for detecting the focusing condition of the objective lens.

FIG. 7 is a perspective view showing an embodiment of the photodetector presetting dial 26. The dial 26 comprises a rotary disc 35 connected to a rotating shaft 36 and a brush electrode 37 connected to the earth. A plurality of electrodes 38-1, 38-2, ... are arranged along a locus of a tip of the brush electrode 37. These electrodes 38-1, 38-2, ... are connected to the central processing unit 22 by means of separate conductors. Therefore, the central processing unit 22 receives information representing an electrode connected to the brush electrode 37, i.e. the region of the photodetector array preset by the dial 26.

Figure 8:
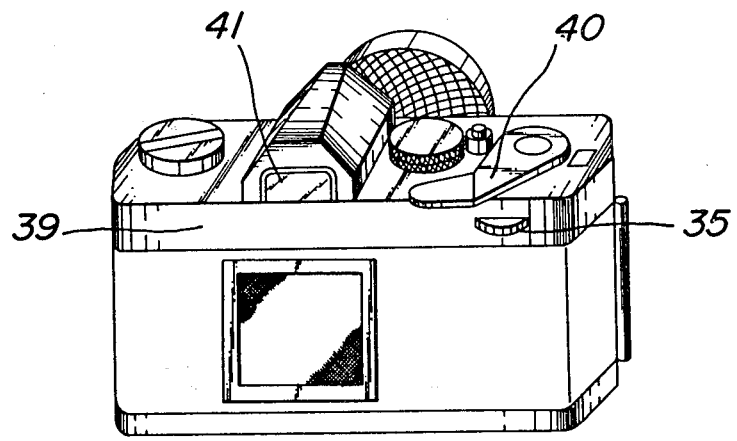
FIG. 8 is a perspective view depicting a single-lens reflex camera comprising the focus detecting apparatus according to the invention.

FIG. 8 is a perspective view showing a single-lens reflex type camera in which the photodetector region presetting dial 26 is installed. The dial 26 is so provided that a part thereof is exposed outside from a rear wall 39 of a camera body at a position underneath a film winder lever 40. The user can easily change a desired region of the photodetector array 20 by rotating the dial 35 with a thumb of his right hand, while looking into a finder 41.

FIG. 9 is a block diagram showing an embodiment of an electric circuit including a portion of the presetting dial 26 to the display device 28. The presetting dial 26 is represented by eight switches 50-1 to 50-8 composed of the brush electrode 37 and fixed electrodes 38-1, 38-2, ... shown in FIG. 7. Now it is assumed that the switch 50-5 is closed. The central processing unit 22 detects this and latches data of (11110000) into a latch circuit 52 through a data bus 51. A reference numeral 53 denotes a signal line. The display device 28 comprises sixteen light emitting diodes 54-1 to 54-16 which are connected to output terminals 52-1 to 52-8 of the latch circuit 52 as illustrated in FIG. 9. Therefore, when the outputs of the latch circuit 52 are (11110000), eight diodes 54-1 to 54-4 and 54-13 to 54-16 on opposite sides of the display device 28 are not lighted on and only central eight diodes 54-5 to 54-12 are lighted on as shown by a hatched region in FIG. 10. The user can see the display device 28 through the finder and can know the active region of the photodetector array 20 with the aid of the bright region of the display device 28. In this manner the user can easily and accurately adjust the size of the field of view for the focus detection in accordance with the size of the subject image onto which the objective image is to be focused.

As explained above in detail, according to the invention a region of the photodetector array which is used for detecting the focusing condition of the objective lens can be electrically changed or adjusted at will in accordance with the subject image. Further, the user can monitor or certify the region of the photodetector array with the aid of the image of the display device through the view finder. In this manner by means of the focus detecting apparatus according to the invention, the objective lens can be focused accurately with respect to a subject in a scene.

The present invention is not limited to the embodiments explained above, but many modifications may be conceived within the scope of the invention. In the above embodiment the display device is composed of the light emitting diodes, but it may be formed by a liquid crystal. In such a case, a region of the display device which is not lighted on is transparent and thus, an inspection of the finder image is less hindered by the display device. Further, in the above embodiment the region of the photodetector array is divided precisely, but it may be divided much more roughly. In such a case the presetting means and display means may be much simpler. Moreover, in the above embodiment the photodetectors which are not used for the focus detection are preset by the dial, but photodetectors which are used for the focus detection may be preset. It should be noted that two photodetector arrays may be arranged on both sides of the predetermined focal plane and in this case the focusing condition may be detected by deriving a difference between two values of the evaluation function each calculated from the image signals supplied from respective photodetector arrays.

In the above embodiments the region of the photodetector array used for detecting the focusing condition of the objective lens is manually selected from the external and the selected region is displayed in the finder. According to the invention, it is also possible to select automatically the region of the photodetector array used for detecting the focusing condition of the objective lens by means of the central processing unit. In such a case, it is not always necessary to display the automatically selected region of the photodetector array and thus, the display device may be dispensed with. The automatic selection of the region of the photodetector array used for detecting the focusing condition of the objective lens may be effected in various manners. For instance, when the evaluation function has more than two peak values, the maximum peak point may be detected as the infocused position.

What is claimed is:

1. In an apparatus for detecting a focusing condition of an objective lens of an optical device comprising a focusing screen arranged at a position optically conjugated with a predetermined focal plane, a viewfinder for inspecting an image of an object formed on said focusing screen, a photodetector array having a number of photodetectors arranged closely side by side on or near a plane which is optically conjugated with the predetermined focal plane, means for projecting a part of the object image upon said photodetector array, and means for receiving image signals supplied from said photodetectors and for processing the image signals in accordance with a given evaluation function to detect the focusing condition of the objective lens, the improvement comprising:
   means for selecting an active region portion of said photodetector array for use in detecting the focusing condition, to enable the active region portion to be selectively changed in size and position within the photodetector array to change the size and position of that part of the object image which is used to control focusing.

2. An apparatus according to claim 1, further comprising means for displaying in said viewfinder, the selected active region portion of said photodetector array.

3. An apparatus according to claim 2, wherein said selecting means comprises means for manually selecting the active region portion of said photodetector array.

4. An appaparatus according to claim 1, wherein said selecting means comprises means for presetting desired photodetectors in the photodetector array whose image signals are used for detecting the focusing condition.

5. An apparatus according to claim 3, wherein said selecting means comprises a dial rotatably arranged, a movable electrode arranged rotatably together with the dial, a plurality of electrodes arranged fixedly along a moving locus of said movable electrode and a plurality of conductors each for connecting respective one of said fixedly arranged electrodes to said processing means.

6. An apparatus according to claim 5, wherein said dial is so arranged in a housing of the optical device that a part of the dial is exposed to the outside through an opening formed in said housing.

7. An apparatus according to claim 6, for use in a camera, wherein said opening through which a part of the dial is exposed to the outside is provided in a rear wall of the camera housing beneath a film winding lever.

8. An apparatus according to claim 2, wherein said displaying means comprises an array of a plurality of indicating elements arranged closely side by side and means for actuating given indicating elements in the array corresponding to the selected region of the photodetector array.

9. An apparatus according to claim 8, wherein said indicating elements are arranged on said focusing screen.

10. An apapratus according to claim 9, wherein said indicating element array is formed by an array of a plurality of light emitting diodes arranged closely side by side.

11. An apparatus according to claim 10, wherein said actuating means comprises a latch circuit having a plurality of output terminals each connected to respective light emitting diodes and said latch circuit is controlled to store an information signal representing the size of the active region portion of the photodetector array selected by said selecting means.

12. An apparatus according to claim 11, wherein said latch circuit is so constructed that said information signal denotes light emitting diodes which are not actuated.

13. An apparatus according to claim 1, wherein said latch circuit is so constructed that said light emitting diodes which are not actuated are selected symmetrically with respect to a center of the light emitting diode array.

14. An apparatus according to claim 1 wherein said means for selecting an active region includes means for selecting the size of said active region in response to the size of the object image projected upon the photodetector array.

15. An apparatus according to claim 1 wherein said means for selecting include means for selecting the position of the active region of said photodetector array in response to the size of the object image projected upon the photodetector array.

16. An apparatus for detecting the focusing condition of an objective lens comprising:

an objective lens for projecting an object image;

means having a detection region including an active region for detecting the focusing condition of the objective lens with respect to a part of an object image; and means for selectively altering the size and position of said active region within the detection region of said means for detecting to change the size and position of that part of the object image used to control focusing.

17. The apparatus of claim 16 wherein said means for altering said active region includes means for altering the size of said active region in accordance with the size of said object image.

18. The apparatus of claim 16 wherein said means for altering includes a means for altering the position of the active region in response to the size of the object image.

19. The apparatus of claim 16 wherein said means for altering includes means for altering the size and position of the active region in response to the size of the object image.

* * * * *